United States Patent [19]

Tateishi et al.

[11] Patent Number: 5,650,368
[45] Date of Patent: Jul. 22, 1997

[54] DIELECTRIC CERAMIC COMPOSITION

[75] Inventors: Yuji Tateishi; Akihiro Kaneuchi; Nobuyoshi Fujikawa, all of Kokubu, Japan

[73] Assignee: Kyocera Corporation, Kyoto, Japan

[21] Appl. No.: 686,482

[22] Filed: Jul. 26, 1996

Related U.S. Application Data

[63] Continuation of Ser. No. 348,628, Dec. 2, 1994, abandoned.

[30] Foreign Application Priority Data

| Dec. 2, 1993 | [JP] | Japan | 5-302781 |
| Dec. 28, 1993 | [JP] | Japan | 5-335563 |
| Dec. 28, 1993 | [JP] | Japan | 5-335569 |
| Oct. 28, 1994 | [JP] | Japan | 6-264787 |

[51] Int. Cl.$^6$ .................... C04B 35/49
[52] U.S. Cl. ........................ 501/139
[58] Field of Search ............. 501/139

[56] References Cited

U.S. PATENT DOCUMENTS

| 4,522,927 | 6/1985 | Kashima et al. | 501/139 |
| 5,116,790 | 5/1992 | Bruno et al. | 501/139 |
| 5,223,462 | 6/1993 | Okawa | 501/138 |
| 5,244,851 | 9/1993 | Takahashi et al. | 501/139 |

FOREIGN PATENT DOCUMENTS

| 0534802 | 3/1993 | European Pat. Off. | C04B 35/46 |
| 0020280 | 7/1975 | Japan | 501/139 |
| 3193404 | 8/1988 | Japan | 501/139 |
| 1227303 | 9/1989 | Japan | 501/139 |
| 2242516 | 9/1990 | Japan | 501/139 |
| 2242517 | 9/1990 | Japan | 501/139 |

*Primary Examiner*—Deborah Jones
*Attorney, Agent, or Firm*—Loeb & Loeb LLP

[57] ABSTRACT

A dielectric ceramic composition used for a ceramic capacitor for temperature compensation, a resonator and the like. The dielectric ceramic composition comprises a composite oxide containing, as metal elements, main components of (i) barium, (ii) rare earth elements such as neodymium (Nd) or Nd and Sm in combination, and (iii) elements of the Group IV of periodic table such as titanium (Ti) or Ti and Zr or Sn in combination, and an assistant component of manganese, wherein the main components comprise from 7.5 to 16.25 mol % of a barium oxide, from 16.75 to 23.75 mol % of an oxide of rare earth element, and from 67 to 71.66 mol % of an oxide of element of the Group IV reckoned as a molar composition of the ternary-component-based oxide, the manganese component is contained in an amount of from 0.01 to 0.5% by weight reckoned as $MnCO_3$ with respect to the main components, and sodium component which is an impurity is contained in an amount of not larger than 0.10% by weight with respect to the whole amount.

10 Claims, 5 Drawing Sheets

DIELECTRIC CONSTANT $\varepsilon_r$

TEMPERATURE COEFFICIENT TCC OF ELECTROSTATIC CAPACITY

DIELECTRIC CERAMIC COMPOSITION

This is a continuation of application Ser. No. 08/348,628 filed on Dec. 2, 1994, now abandoned.

BACKGROUND OF THE INVENTION

1. Field of the Invention

The present invention relates to a dielectric ceramic composition, and in particular one that may be used for a ceramic capacitor for temperature compensation, for a resonator, and the like.

2. Description of the Prior Art

Ceramic capacitors for temperature compensation have heretofore been used for accomplishing tuning and resonance in a variety of electric devices. It has been desired to develop a capacitor which is small in size, has a small dielectric loss and has stable dielectric properties.

To meet the requirements for realizing a ceramic capacitor in a small size, the dielectric ceramic must have a large dielectric constant, a small dielectric loss (or, in other words, a large Q-value) and a small change in the dielectric constant despite a change in the temperature. In regard to reliability, the dielectric ceramic must be chemically stable, must have a large mechanical strength, and must have a large strength against thermal shock.

As the dielectric ceramic of this type, a material of the system of $BaO$—$RE_2O_3$—$TiO_2$ (wherein $RE_2O_3$ is an oxide of a rare earth element, the same holds hereinafter) has been extensively used. There has, for instance, been known a $BaO$—$Nd_2O_3$—$TiO_2$ system material (see Japanese Patent Publication No. 20280/1975). The material of this system exhibits a dielectric constant of as large as about 55 to 95 and a temperature coefficient of capacitance TCC from $-212$ to $+124$ ppm/°C.

There has further been known a $BaO$—$(Nd_2O_3Sm_2O_3)$—$TiO_2$ system material (Japanese Laid-Open Patent Publication No. 21010/1982) having a dielectric constant of from 50 to 95 and a TCC of from $-400$ to $+900$ ppm/°C.

However, the $BaO$—$RE_2O_3$—$TiO_2$ system material involves a problem in that it is difficult to confine the temperature coefficient of capacitance TCC from $-30$ to $+30$ ppm/°C. and at the same time maintain a high dielectric constant. When it is attempted to confine the temperature coefficient of capacitance TCC from $-30$ to $+30$ ppm/°C. yet maintain a high dielectric constant, the ceramic composition loses its sintering property. In order to stabilize the sintering property, therefore, a sintering aid such as $SiO_2$ has heretofore been added. Such addition is accompanied, however, by problems such as a decrease in the dielectric constant $\epsilon$ r, deterioration in the temperature coefficient of capacitance TCC and loss of dielectric properties.

SUMMARY OF THE INVENTION

The present invention was contrived in view of the above-mentioned defects. An object of the present invention is to provide a stable dielectric ceramic composition which makes it possible to obtain a small capacitor having a large capacitance and improved reliability, and which further exhibits a dielectric constant $\epsilon$ r of as large as 50 or more, a Q-value of as large as 3000 or more, and a temperature coefficient of capacitance TCC as small as not larger than $\pm 30$ ppm/°C.

The present inventors have forwarded the study concerning the sintering property and dielectric property of a dielectric composition of the above-mentioned Ba—Nd—Ti system, and have discovered that there can be obtained a dielectric ceramic composition exhibiting stable sintering property, a temperature coefficient of capacitance TCC of not larger than $0 \pm 30$ ppm/°C. and excellent properties without the need of adding sintering aids such as $SiO_2$ and the like if the amount of sodium is lowered by using starting materials containing small amounts of sodium and if the amounts of the components are selected to lie within predetermined ranges.

That is, the starting $TiO_2$ (starting $TiO_2$ that is obtained by the sulfuric acid method and is widely used in industries) contains sodium in an amount of about 0.05% by weight. Besides, a sodium carboxylate type dispersing agent that is used for dispersing powders in the slurry for preparing a green sheet by the doctor bade method, contains sodium in an amount of about 5.00% by weight. Therefore, the dielectric ceramic contains sodium in a total amount of about 0.20% by weight. When the amount of sodium exceeds 0.1% by weight, the sintering property is deteriorated and the temperature coefficient of capacitance TCC is deteriorated, too. According to the present invention, however, the amount of sodium is suppressed to be not larger than 0.1% by weight, in order to improve sintering property as well as dielectric property.

According to the present invention, there is provided a dielectric ceramic composition comprising a composite oxide containing, as metal elements, main components of (i) barium, (ii) rare earth elements, such as neodymium (Nd) or Nd and Sm in combination, and (iii) elements of Group IV of the periodic table, such as titanium (Ti) or Ti and Zr or Sn in combination, and an assistant component of manganese, wherein the main components comprise from 7.5 to 16.25 mol % of a barium oxide, from 16.75 to 23.75 mol % of an oxide of a rare earth element, and from 67 to 71.66 mol % of an oxide of an element of the Group IV reckoned as a molar composition of the three-component-based oxide, the manganese component is contained in an amount of from 0.01 to 0.5% by weight reckoned as $MnCO3$ with respect to the main components, and sodium component which is an impurity is contained in an amount of not larger than 0.10% by weight with respect to the whole amount.

According to a preferred embodiment of the present invention, the above-mentioned main components have a molar composition represented by the following formula $$xBaO \cdot yNd_2O_3 \cdot zTiO_2 \tag{1}$$

wherein x, y and z are numbers satisfying the following relations, x+y+z=100, $x \geq 7.5$, $x \leq 12.5$, $y \geq 20.0$, $z \geq 67.0$, $y \leq 0.4286z - 5.7143$, and $z \leq -0.6667x + 76.25$, and, preferably, the crystalline phase contains an $Nd_4Ti_9O_{24}$ phase and an $Nd_2Ti_2O_7$ phase.

According to another preferred embodiment of the present invention, the above-mentioned main components have a molar composition represented by the following formula $$xBaO \cdot y[(1-b)Nd_2O_3 + bSm_2O_3] \cdot zTiO_2 \tag{2}$$

wherein x, y and z are numbers satisfying the following relations, $x+y+z=100$, $x \geq 7.5$, $z \geq 67.0$, $z \leq 71.25$, $y \geq 0.5x+23.75$, $y \leq 0.3333z+0.1667$, and $x \leq -5y+100$, and b is a number satisfying the following relation, $0.05 \leq b < 1$.

According to a further preferred embodiment of the present invention, the above-mentioned main components have a molar composition represented by the following formula $$xBaO \cdot yNd_2O_3 \cdot z[(1-c)TiO_2 + cMeO_2] \quad (3)$$

wherein Me is Zr and/or Sn, and x, y and z are numbers satisfying the following relations, $y \geq 7.5$, $y \leq 22.5$, $z \geq 67.0$, $z \leq -0.495x+76.2312$, and $x \geq 1.006z-62.9217$, and c is a number satisfying the following relation, $0 < c < 1$.

DETAILED DESCRIPTION OF PREFERRED EMBODIMENTS

Figure 1:
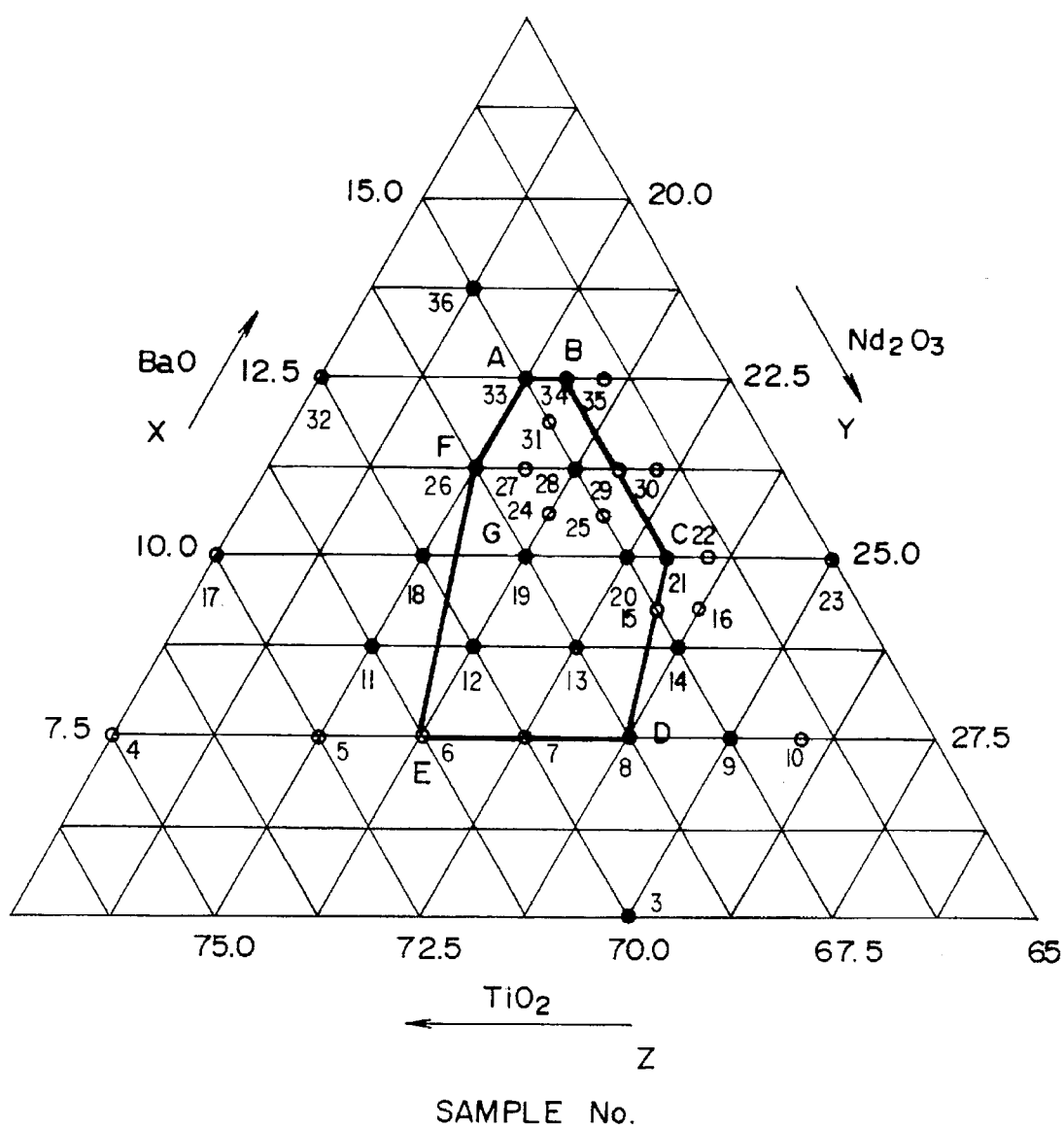
FIG. 1 is a TERNARY diagram illustrating preferred ranges of a molar composition of the system of BaO—Nd$_2$O$_3$—TiO$_2$ according to the present invention.
Figure 2:
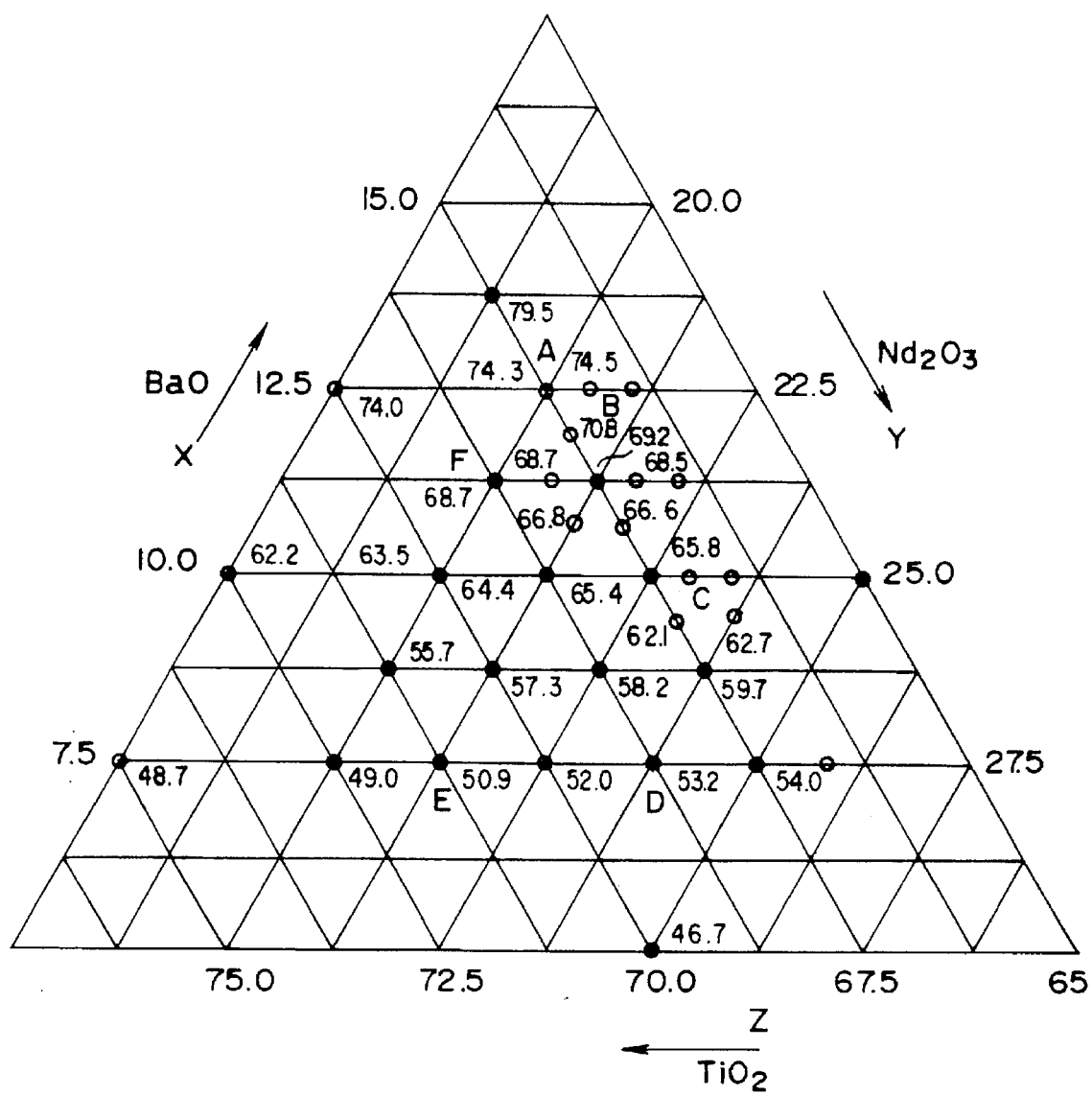
FIG. 2 is a TERNARY diagram illustrating a relationship between the BaO—Nd$_2$O$_3$—TiO$_2$ system composition and the dielectric constant $\epsilon$r.
Figure 3:
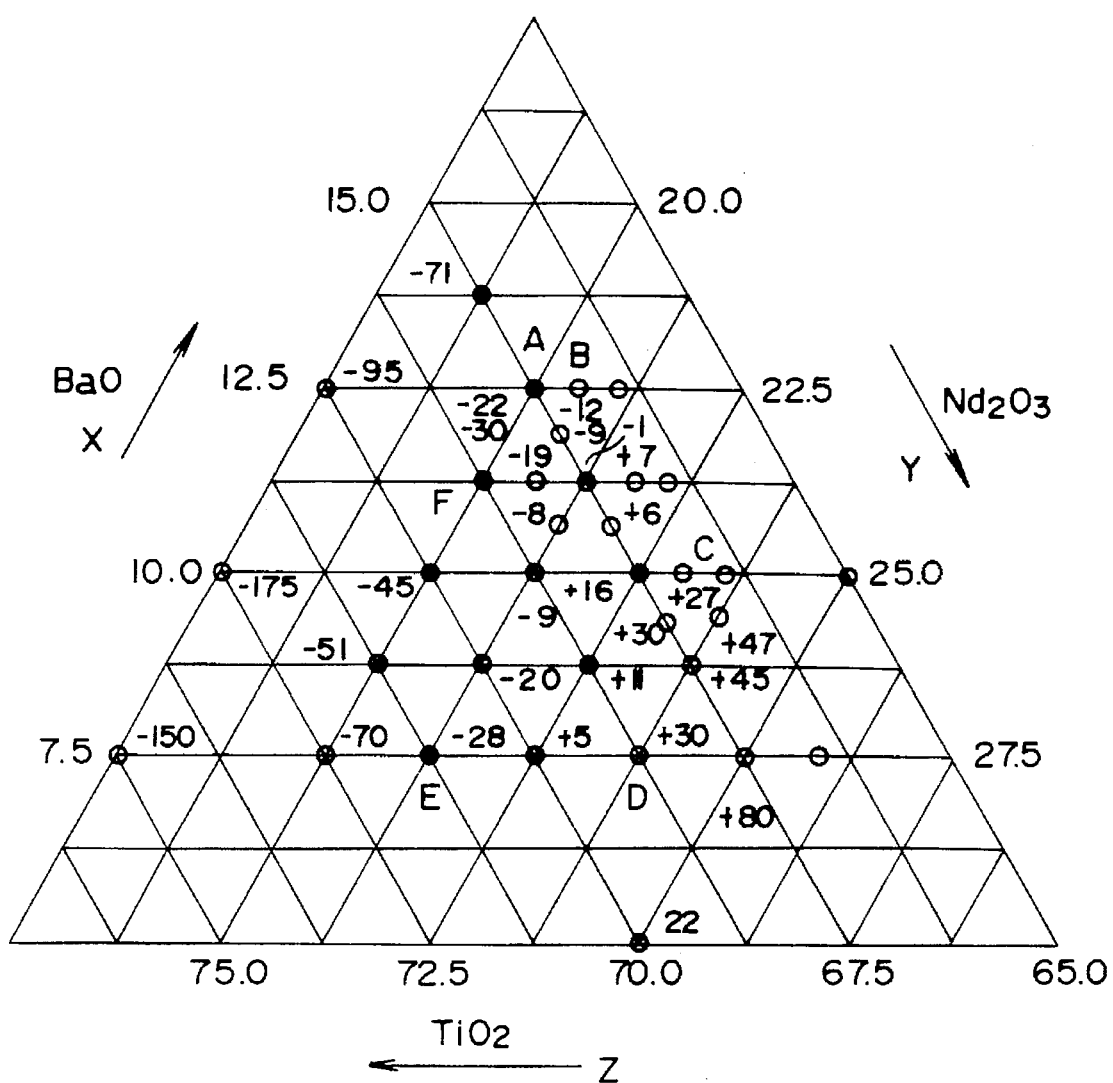
FIG. 3 is a TERNARY diagram illustrating a relationship between the BaO—Nd$_2$O$_3$—TiO$_2$ system composition and the temperature coefficient of capacitance TCC.

A composite oxide of the present invention contains BaO, Nd$_2$O$_3$ and TiO$_2$ as main components and contains manganese as an auxiliary component. Here, however, Nd$_2$O$_3$ in the main components may be partly substituted by Sm$_2$O$_3$, and TiO$_2$ may be partly substituted by ZrO$_2$ or SnO$_2$.

In a composition in accordance with the present invention, the amount of sodium which is an impurity is decreased to be not larger than 0.10% by weight with respect to the whole amount. This is because when the amount of sodium is larger than 0.10% by weight with respect to the whole amount, the sintering property is-deteriorated, the dielectric constant decreases, the Q-value decreases, and the temperature coefficient of capacitance is deteriorated. It is particularly desirable that the amount of sodium is not larger than 0.05% by weight with respect to the whole amount.

The amount of sodium can be decreased by using powders of BaO (or BaCO$_3$), Nd$_2$O$_3$ and TiO$_2$ of high purity as starting materials, or by using starting materials containing sodium in small amounts, by repeating the calcining to vaporize sodium, and by using a dispersing agent and an organic sticking agent (binder) containing sodium in small amounts at the time of pulverization or molding.

The amount x of BaO is selected to be $7.50 \leq x \leq 16.25$ in terms of a three-component-based molar ratio in the main components. This is because when the amount x of BaO is smaller than 7.50, the dielectric constant becomes smaller than 50, and when the amount x is larger than 16.25, the temperature coefficient of capacitance TCC is deteriorated. The dielectric constant increases with an increase in the amount of BaO.

The amount y of a rare earth element oxide (Re$_2$O$_3$:Re is a rare earth element) including Nd$_2$O$_3$ is selected to be $16.75 \leq y \leq 23.75$. This is because when the amount y of Re$_2$O$_3$ is smaller than 16.75 or is larger than 23.75, the temperature coefficient of capacitance TCC is deteriorated.

Furthermore, the amount z of TiO$_2$ or TiO$_2$+MeO$_2$ (where Me is Zr or Sn) is selected to be $67.00 \leq z \leq 71.66$. This is because when the amount z of TiO$_2$ is smaller than 67.00, the sintering property and temperature coefficient of capacitance TCC are deteriorated and when the amount z is larger than 71.66, the temperature coefficient of capacitance TCC is deteriorated.

Moreover, manganese is contained in an amount of from 0.01 to 0.50% by weight reckoned as MnCO$_3$ with respect to the main components. This is because when the amount of manganese is smaller than 0.01% by weight or is larger than 0.50% by weight, the Q-value decreases. When manganese is contained in an amount of from 0.05 to 0.50% by weight reckoned as MnCO$_3$, the Q-value becomes greater than 4000, which is very desirable. When manganese is contained in an amount of from 0.10 to 0.50% by weight reckoned as MnCO$_3$, the Q-value becomes greater than 5000, which is more desirable.

It is desired that silicon is contained in an amount which is not larger than 0.05% by weight reckoned as SiO$_2$ with respect to the whole amount. When the amount of silicon becomes greater than 0.05% by weight reckoned as SiO$_2$, the Q-value tends to decrease. It is particularly preferred that the amount of silicon be not larger than 0.03% by weight, reckoned as SiO$_2$, with respect to the whole amount.

A preferred ceramic composition (I) of the present invention has a composition represented by the above-mentioned formula (1). The composition range specified by inequalities lies over a region of FIG. 1 surrounded by lines that connect the following points.

|   | x     | y     | z     |
|---|-------|-------|-------|
| A | 12.50 | 20.00 | 67.50 |
| B | 12.50 | 20.50 | 67.00 |
| C | 10.00 | 23.00 | 67.00 |
| D | 7.50  | 23.75 | 68.75 |
| E | 7.50  | 21.25 | 71.25 |
| F | 11.25 | 20.00 | 68.75 |

It is desired that the amount of rare earth element (excluding neodymium) which is an impurity is not larger than 2.5% by weight, reckoned as an oxide, with respect to the whole amount. It is further desired that the amount of silicon which is an impurity is not larger than 0.05 % by weight, reckoned as SiO$_2$, in the whole amount.

The composition comprises BaO (or $BaCO_3$), $Nd_2O_3$ and $TiO_2$, and chiefly precipitates a crystalline phase $BaNd_2Ti_4O_{12}$ upon firing and forms $Nd_2Ti_2O_7$ and $Nd_4Ti_9O_{24}$ to exhibit improved sintering properties and dielectric properties such as temperature coefficient of capacitance TCC.

The composition in which the $Nd_2Ti_2O_7$ phase is formed in the crystalline phase exhibits the temperature coefficient of capacitance TCC that is shifted toward the plus side and is brought close to 0 in contrast with the $BaNd_2Ti_4O_{12}$ phase that has a minus temperature coefficient of capacitance TCC. Moreover, formation of the $Nd_4Ti_9O_{24}$ phase is to improve the sintering property. The amount of the $Nd_2Ti_2O_7$ phase and the amount of the $Nd_4TiO_9O_{24}$ phase can be adjusted by adjusting the mixing amounts of BaO (or $BaCO_3$), $Nd_2O_3$ and $TiO_2$ which are starting materials.

In this composition, it is desired that the amount of rare earth element (excluding neodymium) which is an impurity is not larger than 2.5% by weight reckoned as an oxide with respect to the whole amount. This is because when the amount of rare earth element is not larger than 2.5% by weight reckoned as an oxide with respect to the whole amount, the dielectric property is not affected. It is desired that the amount of rare earth element is not larger than 1.0% by weight reckoned as an oxide with respect to the whole amount. Rare earth elements which are impurities are in most cases introduced from $Nd_2O_3$ which is the starting neodymium material.

In the ceramic composition (I), it is desired that x, y and z lie within a range that satisfies the following inequalities, $x \geq 10.0$,
$x \leq 12.5$,
$y \geq 20.0$,
$z \geq 67.0$,
and
$z \leq 68.75$, i.e., x, y and z lie within a range surrounded by lines connecting the following points A, B, C, G, F and A in the ternary-component system of FIG. 1.

|   | x     | y     | z     |
|---|-------|-------|-------|
| A | 12.50 | 20.00 | 67.50 |
| B | 12.50 | 20.50 | 67.00 |
| C | 10.00 | 23.00 | 67.00 |
| G | 10.00 | 21.25 | 68.75 |
| F | 11.25 | 20.00 | 68.75 |

The ceramic composition (I) of the present invention is prepared as described below. That is, powders of $BaCO_3$, (BaO), $TiO_2$, and $MnCO_3$ having purities of not lower than 99% and a powder of $Nd_2O_3$ (which may contain rare earth elements such as Pr, Sm, etc. which are impurities) of a purity of not lower than 95% are weighed and mixed together in a manner that the content of sodium and the content of silicon reckoned as $SiO_2$ in the composition lie within ranges of the present invention, that the amounts of rare earth elements (Sm, Pr, La, etc. which are impurities) reckoned as oxides lie within ranges of the present invention and that the composition of a sintered product lies within a range of the present invention. The mixture is dried and is then calcined at 1000° to 1200° C. for 1 to 3 hours.

The calcined powder is pulverized using a ball mill, and to which is added an organic sticking agent (binder) containing sodium in a small amount, followed by stirring. The mixture is then formed into a green-sheet by, for example, a doctor blade method. Pieces of the green sheet are stacked one upon the other and the binder is removed therefrom, followed by firing in air at a temperature of 1280° to 1340° C. for 1 to 3 hours to obtain a dielectric ceramic composition of the present invention.

Another preferred ceramic composition (II) of the present invention is represented by the above-mentioned formula (2). The composition range specified by the inequalities is a region of FIG. 4 surrounded by lines that connect the following points:

|   | x     | y     | z     |
|---|-------|-------|-------|
| A | 16.25 | 16.75 | 67.00 |
| B | 10.50 | 22.50 | 67.00 |
| C | 7.50  | 23.25 | 69.25 |
| D | 7.50  | 21.25 | 71.25 |
| E | 10.00 | 18.75 | 71.25 |
| F | 12.50 | 17.50 | 70.00 |

In this composition, the amount b of substituting $Nd_2$ by $Sm_2O_3$ is selected to be $0.05 \leq b \leq 1.00$. This is because when the amount b of substitution is smaller than 0.05, the temperature coefficient of capacitance TCC is not almost shifted toward the plus side despite $Sm_2O_3$ being added.

It is particularly preferred that the amount b of substitution be from 0.05 to 0.95.

The ceramic composition (II) exhibits the temperature coefficient of capacitance TCC of within $0 \pm 30$ ppm/°C. (COG property, NPO:MIL spec) and a dielectric constant of not smaller than 60 when x, y and z lie within ranges that satisfy the following inequalities, $z \leq 67.0$
$y \leq 22.5$
$x \geq 10.0$
$y \geq -1.00667x + 31.9167$
and
$z \leq -0.8x + 80$, i.e., when x, y and z lie within a range surrounded by the following a, b, c, d and e in the ternary-component system.

|   | x     | y     | z     |
|---|-------|-------|-------|
| a | 16.25 | 16.75 | 67.00 |
| b | 10.50 | 22.50 | 67.00 |
| c | 10.00 | 22.50 | 67.50 |
| d | 10.00 | 21.25 | 68.75 |
| e | 13.75 | 17.25 | 69.00 |

This composition is prepared in the same manner as the above-mentioned preparation method but partly substituting $Nd_2O_3$ by $SM_2O_3$.

A further preferred ceramic composition (III) of the present invention is represented by the above-mentioned formula (3). The composition range specified by the inequalities is a region of FIG. 5 surrounded by lines connecting the following points,

|   | x     | y     | z     |
|---|-------|-------|-------|
| A | 15.50 | 17.50 | 67.00 |
| B | 10.50 | 22.50 | 67.00 |
| C | 7.50  | 22.50 | 70.00 |
| D | 9.17  | 19.17 | 71.66 |
| E | 12.50 | 17.50 | 70.00 |

In this composition, it is desired that the ratio c of $MeO_2$ with respect to the total amount of $TiO_2$ and $MeO_2$ is $0.01 \leq c \leq 0.10$. This is because when the ratio c is smaller than 0.01, the temperature coefficient of capacitance TCC is not almost shifted toward the plus side despite $ZrO_2$ being added. When the ratio c becomes larger than 0.10, on the other hand, the dielectric constant decreases to a great extent.

The ceramic composition (III) exhibits a temperature coefficient of capacitance TCC of within 0±30 ppm/°C. (COG property, NPO:MIL spec) and a dielectric constant of not smaller than 60 when x, y and z lie within ranges that satisfy the following inequalities, $y \geq 17.5$
$y \leq 22.5$
$z \geq 67.0$
$x \geq 10.0$
and
$z \leq -0.5x + 75$ i.e., when x, y and z lie within a range surrounded by the following a, b, c, d and e in the ternary-component system,

|   | x | y | z |
|---|---|---|---|
| a | 15.50 | 17.50 | 67.00 |
| b | 10.50 | 22.50 | 67.00 |
| c | 10.00 | 22.50 | 70.00 |
| d | 10.00 | 20.00 | 70.00 |
| e | 15.00 | 17.25 | 67.50 |

The composition (III) is prepared in the same manner as the above-mentioned method of preparing the composition (I) but partly substituting $TiO_2$ by $ZrO_2$ or $SnO_2$.

As described above, the dielectric ceramic composition of the present invention can be calcined at a temperature of lower than 1340° C. with using a sintering aid such as $SiO_2$ or the like, exhibits a small change in the capacitance despite a change in temperature, and exhibits a large dielectric constant and a high Q-value. Therefore, the dielectric ceramic composition of the present invention can be desirably used for a ceramic capacitor for temperature compensation having an internal electrode of palladium.

This dielectric ceramic exhibits a dielectric constant which is as high as not smaller than 50 and, particularly, not smaller than 60 and a temperature coefficient of capacitance TCC of within 0±30 ppm/°C. at a measuring frequency of 1 MHz.

The invention will now be described by way of Examples.

EXAMPLE 1

Powders of $BaCO_3$, $TiO_2$ and $MnCO_3$ having purities of not smaller than 99% and a powder of $Nd_2O_3$ having a predetermined purity were used as starting materials, and the amounts of impurities in the starting materials were controlled to adjust the contents of rare earth elements such as Na, Si, Pr, Sm and the like in the composition. These powders were weighed at ratios shown in Tables 1, 2 and 3, and were mixed together a whole day and night using resin balls while adding pure water thereto. The mixture was dried and was then calcined at 1180° C. for 2 hours.

The calcined powder was pulverized by using a ball mill for 20 hours, and an organic sticking agent was added thereto, followed by stirring. The mixture was then molded into a green sheet of a thickness of 50 μm by a doctor blade method. 25 Pieces of this green sheet were stacked one upon the other and were hot-pressed to prepare a green molded plate which was then punched into a disk 20 mm in diameter and about 1 mm in thickness. The molded article was then subjected to a treatment at 300° C. for 2 hours to remove the binder, and was then calcined in air at a temperature of 1280° to 1340° C. for 2 hours.

TABLE 1

| | Composition ratio | | | | Impurities (wt %) | | | |
|---|---|---|---|---|---|---|---|---|
| Sample No. | BaO x (mol %) | $Nd_2O_3$ y (mol %) | $TiO_2$ z (mol %) | $MnCO_3$ (wt %) | reckoned as $SiO_2$ | Na | reckoned as $Pr_4O_{11}$ | reckoned as $Sm_2O_3$ |
| *1 | 0 | 18.18 | 81.82 | 0.2 | <0.01 | <0.01 | 0.58 | <0.01 |
| *2 | 0 | 33.33 | 66.67 | 0.2 | <0.01 | <0.01 | 0.81 | <0.01 |
| *3 | 5.00 | 25.00 | 70.00 | 0.2 | <0.01 | <0.01 | 0.61 | <0.01 |
| *4 | 7.50 | 17.50 | 75.00 | 0.2 | <0.01 | <0.01 | 0.54 | <0.01 |
| *5 | 7.50 | 20.00 | 72.50 | 0.2 | <0.01 | <0.01 | 0.59 | <0.01 |
| 6 | 7.50 | 21.25 | 71.25 | 0.2 | <0.01 | <0.01 | 0.61 | <0.01 |
| 7 | 7.50 | 22.50 | 70.00 | 0.2 | <0.01 | <0.01 | 0.63 | <0.01 |
| 8 | 7.50 | 23.75 | 68.75 | 0.2 | <0.01 | <0.01 | 0.65 | <0.01 |
| *9 | 7.50 | 25.00 | 67.50 | 0.2 | <0.01 | <0.01 | 0.67 | <0.01 |
| *10 | 7.50 | 25.83 | 66.67 | 0.2 | <0.01 | <0.01 | 0.68 | <0.01 |
| *11 | 8.75 | 20.00 | 71.25 | 0.2 | <0.01 | <0.01 | 0.58 | <0.01 |
| 12 | 8.75 | 21.25 | 70.00 | 0.2 | <0.01 | <0.01 | 0.60 | <0.01 |
| 13 | 8.75 | 22.50 | 68.75 | 0.2 | <0.01 | <0.01 | 0.63 | <0.01 |
| *14 | 8.75 | 23.75 | 67.50 | 0.2 | <0.01 | <0.01 | 0.65 | <0.01 |
| 15 | 9.25 | 23.25 | 67.50 | 0.2 | <0.01 | <0.01 | 0.64 | <0.01 |
| *16 | 9.25 | 23.75 | 67.00 | 0.2 | <0.01 | <0.01 | 0.64 | <0.01 |
| *17 | 10.00 | 17.50 | 72.50 | 0.2 | <0.01 | <0.01 | 0.53 | <0.01 |
| *18 | 10.00 | 20.00 | 70.00 | 0.2 | <0.01 | <0.01 | 0.58 | <0.01 |
| 19 | 10.00 | 21.25 | 68.75 | 0.2 | <0.01 | <0.01 | 0.60 | <0.01 |
| 20 | 10.00 | 22.50 | 67.50 | 0.2 | <0.01 | <0.01 | 0.63 | <0.01 |
| 21 | 10.00 | 23.00 | 67.00 | 0.2 | <0.01 | <0.01 | 0.64 | <0.01 |
| *22 | 10.00 | 23.33 | 66.67 | 0.2 | <0.01 | <0.01 | 0.64 | <0.01 |
| *23 | 10.00 | 25.00 | 65.00 | 0.2 | <0.01 | <0.01 | 0.67 | <0.01 |
| 24 | 10.63 | 21.25 | 68.12 | 0.2 | <0.01 | <0.01 | 0.60 | <0.01 |

Samples marked with * lie outside the scope of the invention.

TABLE 2

| Sample No. | BaO x (mol %) | Nd₂O₃ y (mol %) | TiO₂ z (mol %) | MnCO₃ (wt %) | reckoned as SiO₂ | Na | reckoned as Pr₄O₁₁ | reckoned as Sm₂O₃ |
|---|---|---|---|---|---|---|---|---|
| 25 | 10.63 | 21.87 | 67.50 | 0.2 | <0.01 | <0.01 | 0.61 | <0.01 |
| 26 | 11.25 | 20.00 | 68.75 | 0.2 | <0.01 | <0.01 | 0.58 | <0.01 |
| 27 | 11.25 | 20.63 | 68.12 | 0.2 | <0.01 | <0.01 | 0.59 | <0.01 |
| 28 | 11.25 | 21.25 | 67.50 | 0.2 | <0.01 | <0.01 | 0.60 | <0.01 |
| 29 | 11.25 | 21.75 | 67.00 | 0.2 | <0.01 | <0.01 | 0.61 | <0.01 |
| *30 | 11.25 | 22.08 | 66.67 | 0.2 | <0.01 | <0.01 | 0.62 | <0.01 |
| 31 | 11.87 | 20.63 | 67.50 | 0.2 | <0.01 | <0.01 | 0.59 | <0.01 |
| *32 | 12.50 | 17.50 | 70.00 | 0.2 | <0.01 | <0.01 | 0.53 | <0.01 |
| 33 | 12.50 | 20.00 | 67.50 | 0.2 | <0.01 | <0.01 | 0.58 | <0.01 |
| 34 | 12.50 | 20.50 | 67.00 | 0.2 | <0.01 | <0.01 | 0.58 | <0.01 |
| *35 | 12.50 | 20.83 | 66.67 | 0.2 | <0.01 | <0.01 | 0.59 | <0.01 |
| *36 | 13.75 | 18.75 | 67.50 | 0.2 | <0.01 | <0.01 | 0.53 | <0.01 |
| *37 | 16.67 | 16.67 | 66.66 | 0.2 | <0.01 | <0.01 | 0.50 | <0.01 |
| *38 | 11.25 | 21.25 | 67.50 | 0 | <0.01 | <0.01 | 0.60 | <0.01 |
| 39 | 11.25 | 21.25 | 67.50 | 0.01 | <0.01 | <0.01 | 0.60 | <0.01 |
| 40 | 11.25 | 21.25 | 67.50 | 0.03 | <0.01 | <0.01 | 0.59 | <0.01 |
| 41 | 11.25 | 21.25 | 67.50 | 0.03 | <0.01 | <0.01 | 0.60 | <0.01 |
| 42 | 11.25 | 21.25 | 67.50 | 0.1 | <0.01 | <0.01 | 0.59 | <0.01 |
| 43 | 11.25 | 21.25 | 67.50 | 0.5 | <0.01 | <0.01 | 0.61 | <0.01 |
| *44 | 11.25 | 21.25 | 67.50 | 0.7 | <0.01 | <0.01 | 0.61 | <0.01 |
| 45 | 11.25 | 21.25 | 67.50 | 0.2 | <0.01 | <0.01 | 0.58 | <0.01 |
| 46 | 11.25 | 21.25 | 67.50 | 0.2 | <0.01 | <0.01 | 0.60 | <0.01 |
| 47 | 11.25 | 21.25 | 67.50 | 0.2 | <0.01 | <0.01 | 0.60 | <0.01 |
| 48 | 11.25 | 21.25 | 67.50 | 0.2 | <0.01 | <0.01 | 0.59 | <0.01 |

Samples marked with * lie outside the scope of the invention.

TABLE 3

| Sample No. | BaO x (mol %) | Nd₂O₃ y (mol %) | TiO₂ z (mol %) | MnCO₃ (wt %) | reckoned as SiO₂ | Na | reckoned as Pr₄O₁₁ | reckoned as Sm₂O₃ |
|---|---|---|---|---|---|---|---|---|
| 49 | 11.25 | 21.25 | 67.50 | 0.2 | <0.01 | 0.08 | 0.60 | <0.01 |
| 50 | 11.25 | 21.25 | 67.50 | 0.2 | <0.01 | 0.10 | 0.58 | <0.01 |
| *51 | 11.25 | 21.25 | 67.50 | 0.2 | <0.01 | 0.17 | 0.60 | <0.01 |
| *52 | 11.25 | 21.25 | 67.50 | 0.2 | <0.01 | 0.50 | 0.59 | <0.01 |
| 53 | 11.25 | 21.25 | 67.50 | 0.2 | 0.03 | <0.01 | 0.61 | <0.01 |
| 54 | 11.25 | 21.25 | 67.50 | 0.2 | 0.05 | <0.01 | 0.60 | <0.01 |
| 55 | 11.25 | 20.00 | 67.75 | 0.2 | <0.01 | <0.01 | 0.50 | <0.01 |
| 56 | 12.25 | 20.00 | 67.75 | 0.2 | <0.01 | <0.01 | 2.50 | <0.01 |
| 57 | 11.25 | 21.25 | 67.50 | 0.2 | <0.01 | <0.01 | 0.25 | <0.01 |
| 58 | 11.25 | 21.25 | 67.50 | 0.2 | <0.01 | <0.01 | 0.50 | <0.01 |
| 59 | 11.25 | 21.25 | 67.50 | 0.2 | <0.01 | <0.01 | 1.25 | <0.01 |
| 60 | 11.25 | 21.25 | 67.50 | 0.2 | <0.01 | <0.01 | 2.50 | <0.01 |
| 61 | 10.00 | 23.00 | 67.00 | 0.2 | <0.01 | <0.01 | <0.01 | 0.5 |
| 62 | 10.00 | 23.00 | 67.00 | 0.2 | <0.01 | <0.01 | <0.01 | 2.5 |

Samples marked with * lie outside the scope of the invention.

In the sintered products, the presence of $La_2O_3$ and $CeO_2$ was detected in amounts of not larger than 0.01% by weight in addition to $Pr_6O_{11}$ and $Sm_2O_3$. They were, in most cases, introduced from the $Nd_2O_3$ that was the starting material.

Silver electrodes were formed on the upper and lower whole surfaces of the obtained ceramic disks to form disk-type capacitors of a single layer, which were then used as samples for evaluation. The samples were measured for their capacitances (C) and quality s (Q-values) at a frequency of 1 MHz and an input power level of 1 Vrms, and were measured for their temperature coefficients of capacitance TCC at a frequency of 1 MHz over a temperature range of from −55° C. to 125° C.

Furthermore, the samples were measured for their diameters (D) and thicknesses (T) to an accuracy of ±5 μm and were measured for their weights (m) to an accuracy of ±5 mg to calculate their dielectric constants ε r and densities ρ. The $Nd_4Ti_9O_{24}$ phase and the $Nd_2Ti_9O_7$ phase of the obtained ceramics were identified by the X-ray diffraction measurement and X-ray macroanalyzer. The results were as shown in Tables 4, 5 and 6.

TABLE 4

| Sample No. | Density g/cm³ | Dielectric constant εr | Q-value | TCC ppm/C | Firing temp. C. | Nd₂Ti₂O₇ phase | Nd₄Ti₉O₂₄ phase |
|---|---|---|---|---|---|---|---|
| *1 | 5.00 | 38.4 | 10000< | −148 | 1340 | not exist | exist |
| *2 | 5.96 | 37.1 | 10000< | +234 | 1340 | exist | exist |
| *3 | 5.57 | 46.7 | 10000< | +22 | 1340 | exist | exist |
| *4 | 4.63 | 48.7 | 4539 | −150 | 1340 | exist | exist |
| *5 | 4.62 | 49.0 | 4396 | −70 | 1340 | exist | exist |
| 6 | 4.88 | 50.9 | 5741 | −28 | 1340 | exist | exist |
| 7 | 5.3 | 52.0 | 10000< | +5 | 1340 | exist | exist |
| 8 | 5.55 | 53.2 | 5128 | +30 | 1340 | exist | exist |
| *9 | 5.79 | 54.0 | 10000< | +80 | 1340 | exist | exist |
| *10 | | | not sintered | | 1340 | exist | not exist |
| *11 | 5.37 | 55.7 | 7116 | −51 | 1340 | exist | exist |
| 12 | 5.49 | 57.3 | 10000< | −20 | 1340 | exist | exist |
| 13 | 5.60 | 58.2 | 6538 | +11 | 1340 | exist | exist |
| *14 | 5.61 | 59.7 | 8256 | +45 | 1340 | exist | exist |
| 15 | 5.73 | 62.1 | 10000< | +30 | 1340 | exist | exist |
| *16 | 5.72 | 62.7 | 10000< | +47 | 1340 | exist | exist |
| *17 | 5.08 | 62.2 | 8203 | −175 | 1340 | exist | exist |
| *18 | 5.42 | 63.5 | 5602 | −45 | 1340 | exist | exist |
| 19 | 5.63 | 64.4 | 7330 | −9 | 1340 | exist | exist |
| 20 | 5.74 | 65.4 | 8221 | +16 | 1340 | exist | exist |
| 21 | 5.75 | 65.8 | 7968 | +27 | 1340 | exist | exist |
| *22 | | | not sintered | | 1340 | exist | not exist |
| *23 | | | not sintered | | 1340 | exist | not exist |
| 24 | 6.65 | 66.8 | 9788 | −8 | 1340 | exist | exist |

Samples marked with * lie outside the scope of the invention.

TABLE 5

| Sample No. | Density g/cm³ | Dielectric constant εr | Q-value | TCC ppm/C | Firing temp. C. | Nd₂Ti₂O₇ phase | Nd₄Ti₉O₂₄ phase |
|---|---|---|---|---|---|---|---|
| 25 | 5.72 | 66.6 | 6938 | +6 | 1340 | exist | exist |
| 26 | 5.58 | 68.7 | 6327 | −30 | 1340 | exist | exist |
| 27 | 5.65 | 68.7 | 6840 | −19 | 1340 | exist | exist |
| 28 | 5.71 | 69.2 | 6785 | −1 | 1340 | exist | exist |
| 29 | 5.73 | 69.5 | 6993 | +7 | 1340 | exist | exist |
| *30 | | | not sintered | | 1340 | exist | not exist |
| 31 | 5.69 | 70.8 | 7537 | −9 | 1340 | exist | exist |
| *32 | 5.42 | 74.0 | 10000> | −95 | 1340 | exist | exist |
| 33 | 5.74 | 74.3 | 8466 | −22 | 1340 | exist | exist |
| 34 | 5.74 | 74.5 | 8525 | −12 | 1340 | exist | exist |
| *35 | | | not sintered | | 1340 | exist | not exist |
| *36 | 5.70 | 79.5 | 8126 | −71 | 1340 | exist | exist |
| *37 | 5.62 | 87.9 | 10000< | −156 | 1340 | not exist | exist |
| *38 | 5.66 | 65.1 | 763 | −2 | 1340 | exist | exist |
| 39 | 5.69 | 67.0 | 3370 | −1 | 1340 | exist | exist |
| 40 | 5.69 | 67.2 | 3653 | −1 | 1340 | exist | exist |
| 41 | 5.68 | 67.5 | 4348 | −1 | 1340 | exist | exist |
| 42 | 5.67 | 67.8 | 5523 | −1 | 1340 | exist | exist |
| 43 | 5.67 | 68.3 | 6950 | 0 | 1340 | exist | exist |
| *44 | 5.59 | 63.3 | 1854 | +2 | 1340 | exist | exist |
| 45 | 5.73 | 68.5 | 6035 | +3 | 1320 | exist | exist |
| 46 | 5.72 | 67.9 | 4976 | +6 | 1300 | exist | exist |
| 47 | 5.65 | 65.9 | 10000< | +9 | 1280 | exist | exist |
| 48 | 6.68 | 69.0 | 6558 | −3 | 1340 | exist | exist |

Samples marked with * lie outside the scope of the invention.

TABLE 6

| Sample No. | Density g/cm³ | Dielectric constant εr | Q-value | TCC ppm/C | Firing temp. C. | Nd₂Ti₂O₇ phase | Nd₄Ti₉O₂₄ phase |
|---|---|---|---|---|---|---|---|
| 49 | 5.64 | 68.5 | 6654 | −10 | 1340 | exist | exist |
| 50 | 5.66 | 67.9 | 6512 | −11 | 1340 | exist | exist |
| *51 | 5.42 | 65.9 | 2326 | −14 | 1340 | exist | exist |
| *52 | | | not sintered | | 1340 | exist | exist |
| 53 | 5.70 | 67.8 | 6024 | −18 | 1340 | exist | exist |
| 54 | 5.66 | 65.7 | 5953 | −28 | 1340 | exist | exist |
| 55 | 5.60 | 68.8 | 8520 | −29 | 1340 | exist | exist |
| 56 | 5.61 | 68.7 | 6824 | −30 | 1340 | exist | exist |
| 57 | 5.72 | 68.8 | 5905 | 0 | 1340 | exist | exist |
| 58 | 5.72 | 69.2 | 10000< | −3 | 1340 | exist | exist |
| 59 | 5.71 | 69.0 | 4750 | −6 | 1340 | exist | exist |
| 60 | 5.76 | 69.2 | 6843 | −4 | 1340 | exist | exist |
| 61 | 5.74 | 66.0 | 7332 | +27 | 1340 | exist | exist |
| 62 | 5.74 | 65.7 | 7120 | +29 | 1340 | exist | exist |

Samples marked with * lie outside the scope of the invention.

As will be obvious from Tables 4, 5 and 6, porous samples only could be prepared in the region (Nos. 10, 22, 23, 30, 35) without containing the $Nd_4Ti_9O_{24}$ phase at a temperature of from 1280° to 1340° C., which, however, could not be sintered. In the composition range of the present invention, on the other hand, the $Nd_4Ti_9O_{24}$ phase was formed in a suitable amount, contributing to improved sintering property without the need of adding sintering aids. By adjusting the formation ratios of the $BaNd_2Ti_4O_{12}$ phase, $Nd_4Ti_9O_{12}$ phase and $Nd_2Ti_2O_7$ phase, furthermore, ceramic compositions having stable temperature coefficients and high dielectric constants could be prepared.

It will be understood that the Q-value decreases and the dielectric property deteriorates as the amount of manganese reckoned as $MnCO_3$ becomes smaller than 0.01% by weight or not smaller than 0.5% by weight.

The sintering property is deteriorated by the introduction of sodium. Accompanying this, the dielectric constant decreases, the Q-value decreases and the temperature coefficient of capacitance TCC is deteriorated.

Moreover, introduction of rare earth elements other than neodymium which are impurities cause the dielectric constant εr and the temperature coefficient of capacitance TCC to change.

Furthermore, an increase in the amount of silicon results in a decrease in the dielectric constant, whereby the absolute value of the temperature coefficient of capacitance TCC increases and the Q-value decreases. Preventing the introduction of silicon makes it possible to prepare a ceramic composition having a stable temperature coefficient of capacitance and a large dielectric constant.

EXAMPLE 2

Powders of $BaCO_3$, $TiO_2$ and $MnCO_3$ having purities of not smaller than 99% and powders of $Nd_2O_3$ and $Sm_2O_3$ (into which may be introduced Pr and the like as impurities of rare earth oxides) having purities of not smaller than 95% were used as starting materials, and the amounts of impurities in the starting materials were controlled to adjust the contents of Na and Si in the composition. These powders were weighed at ratios shown in Tables 7 and 8, and were mixed together a whole day and night using resin balls while adding pure water thereto. The mixture was dried and was then calcined at 1180° C. for 2 hours. The calcined powder was pulverized by using a ball mill for 20 hours, and an organic sticking agent was added thereto, followed by stirring. The mixture was then molded into a green sheet of a thickness of 50 μm by a doctor blade method. 25 Pieces of this green sheet were stacked one upon the other and were hot-pressed to prepare a green molded plate which was then punched into a disk 20 mm in diameter and about 1 mm in thickness. The molded article was then subjected to a treatment at 300° C. for 2 hours to remove the binder, and was then calcined in the air at a temperature of 1280° to 1340° C. for 2 hours.

TABLE 7

| | Composition ratio | | | | Impurities additives (wt %) | | | Properties | | |
|---|---|---|---|---|---|---|---|---|---|---|
| Sample No. | BaO x (mol %) | Re₂O₃ y (mol %) | TiO₂ z (mol %) | b | MnCO₃ (wt %) | reckoned as SiO₂ | Na | Dielectric const. εr | Q-value | TCC ppm/C |
| *1 | 7.50 | 20.00 | 72.50 | 0.05 | 0.2 | <0.01 | <0.01 | 48 | 4800 | −55 |
| 2 | 7.50 | 21.25 | 71.25 | 0.05 | 0.2 | <0.01 | <0.01 | 50 | 5900 | −22 |
| 3 | 7.50 | 22.50 | 70.00 | 0.05 | 0.2 | <0.01 | <0.01 | 51 | 6100 | +10 |
| 4 | 7.50 | 23.25 | 69.25 | 0.05 | 0.2 | <0.01 | <0.01 | 52 | 5400 | +26 |
| *5 | 7.50 | 23.75 | 68.75 | 0.05 | 0.2 | <0.01 | <0.01 | 52 | 5500 | +35 |
| 6 | 8.75 | 20.00 | 71.25 | 0.50 | 0.2 | <0.01 | <0.01 | 51 | 7700 | +3 |
| *7 | 8.75 | 23.75 | 67.50 | 0.05 | 0.2 | <0.01 | <0.01 | 59 | 10000< | +51 |
| *8 | 10.00 | 17.50 | 72.50 | 0.95 | 0.2 | <0.01 | <0.01 | 50 | 8500 | −54 |
| 9 | 10.00 | 18.75 | 71.25 | 0.50 | 0.2 | <0.01 | <0.01 | 56 | 7800 | −27 |
| 10 | 10.00 | 18.75 | 71.25 | 0.95 | 0.2 | <0.01 | <0.01 | 50 | 7200 | +20 |
| 11 | 10.00 | 20.00 | 70.00 | 0.50 | 0.2 | <0.01 | <0.01 | 58 | 7200 | +5 |

TABLE 7-continued

| Sample No. | Composition ratio | | | | Impurities additives (wt %) | | Properties | | |
|---|---|---|---|---|---|---|---|---|---|
| | BaO x (mol %) | $Re_2O_3$ y (mol %) | $TiO_2$ z (mol %) | b | $MnCO_3$ (wt %) | reckoned as $SiO_2$ | Na | Dielectric const. $\epsilon r$ | Q-value | TCC ppm/C |

| Sample No. | BaO x (mol %) | $Re_2O_3$ y (mol %) | $TiO_2$ z (mol %) | b | $MnCO_3$ (wt %) | reckoned as $SiO_2$ | Na | Dielectric const. $\epsilon r$ | Q-value | TCC ppm/C |
|---|---|---|---|---|---|---|---|---|---|---|
| *12 | 10.00 | 20.00 | 70.00 | 0 | 0.2 | <0.01 | <0.01 | 63 | 5600 | −45 |
| 13 | 10.00 | 21.25 | 68.75 | 0.05 | 0.2 | <0.01 | <0.01 | 63 | 8500 | −3 |
| 14 | 10.00 | 22.50 | 67.50 | 0.05 | 0.2 | <0.01 | <0.01 | 64 | 8400 | +21 |
| *15 | 10.00 | 23.00 | 67.00 | 0.05 | 0.2 | <0.01 | <0.01 | 65 | 8200 | +35 |
| 16 | 10.50 | 22.50 | 67.00 | 0.05 | 0.2 | <0.01 | <0.01 | 66 | 7700 | +21 |
| 17 | 11.25 | 21.25 | 67.50 | 0.05 | 0.2 | <0.01 | <0.01 | 67 | 7200 | +3 |
| 18 | 11.25 | 21.75 | 6700 | 0.05 | 0.2 | <0.01 | <0.01 | 68 | 7500 | +12 |
| 19 | 12.50 | 17.50 | 70.00 | 0.50 | 0.2 | <0.01 | <0.01 | 58 | 10000< | −26 |
| 20 | 12.50 | 18.75 | 68.75 | 0.50 | 0.2 | <0.01 | <0.01 | 66 | 9100 | +4 |

Samples marked with * lie outside the scope of the invention.

TABLE 8

| Sample No. | BaO x (mol %) | $Re_2O_3$ y (mol %) | $TiO_2$ z (mol %) | b | $MnCO_3$ (wt %) | reckoned as $SiO_2$ | Na | Dielectric const. $\epsilon r$ | Q-value | TCC ppm/C |
|---|---|---|---|---|---|---|---|---|---|---|
| 21 | 12.50 | 20.50 | 67.00 | 0.50 | 0.2 | <0.01 | <0.01 | 74 | 9000 | −7 |
| 22 | 13.75 | 18.75 | 67.50 | 0.50 | 0.2 | <0.01 | <0.01 | 71 | 8800 | −5 |
| *23 | 15.00 | 16.87 | 68.13 | 0.95 | 0.2 | <0.01 | <0.01 | 77 | 10000< | −36 |
| 24 | 15.00 | 17.50 | 67.50 | 0.50 | 0.2 | <0.01 | <0.01 | 77 | 10000< | −21 |
| 25 | 15.00 | 18.00 | 67.00 | 0.50 | 0.2 | <0.01 | <0.01 | 76 | 9100 | −13 |
| 26 | 16.25 | 16.75 | 67.00 | 0.50 | 0.2 | <0.01 | <0.01 | 82 | 10000< | −24 |
| *27 | 11.25 | 21.25 | 67.50 | 0.05 | — | <0.01 | <0.01 | 64 | 800 | +2 |
| 28 | 11.25 | 21.25 | 67.50 | 0.05 | 0.01 | <0.01 | <0.01 | 65 | 3500 | +2 |
| 29 | 11.25 | 21.25 | 67.50 | 0.05 | 0.03 | <0.01 | <0.01 | 66 | 3700 | +2 |
| 30 | 11.25 | 21.25 | 67.50 | 0.05 | 0.05 | <0.01 | <0.01 | 66 | 4000 | +3 |
| 31 | 11.25 | 21.25 | 67.50 | 0.05 | 0.10 | <0.01 | <0.01 | 67 | 5900 | +3 |
| 32 | 11.25 | 21.25 | 67.50 | 0.05 | 0.20 | <0.01 | <0.01 | 67 | 7200 | +3 |
| 33 | 11.25 | 21.25 | 67.50 | 0.05 | 0.50 | <0.01 | <0.01 | 68 | 7400 | +4 |
| *34 | 11.25 | 21.25 | 67.50 | 0.05 | 0.70 | <0.01 | <0.01 | 62 | 1900 | +6 |
| 35 | 11.25 | 21.25 | 67.50 | 0.05 | 0.20 | <0.01 | 0.05 | 68 | 7000 | 0 |
| 36 | 11.25 | 21.25 | 67.50 | 0.05 | 0.20 | <0.01 | 0.08 | 67 | 7000 | −13 |
| 37 | 11.25 | 21.25 | 67.50 | 0.05 | 0.20 | <0.01 | 0.10 | 66 | 6800 | −15 |
| *38 | 11.25 | 21.25 | 67.50 | 0.05 | 0.20 | <0.01 | 0.17 | 64 | 2500 | −19 |
| *39 | 11.25 | 21.25 | 67.00 | 0.05 | 0.20 | <0.01 | 0.50 | | not sintered | |
| 40 | 11.25 | 21.25 | 67.50 | 0.05 | 0.20 | 0.03 | <0.01 | 67 | 6700 | −21 |
| 41 | 11.25 | 21.25 | 67.50 | 0.05 | 0.20 | 0.05 | <0.01 | 64 | 6300 | −30 |

Samples marked with * lie outside the scope of the invention.

Silver electrodes were formed on the upper and lower whole surfaces of the obtained ceramic disks to form disk-type capacitors of a single layer, which were then used as samples for evaluation. The samples were measured for their electrostatic capacities (C) and quality s (Q-values) at a frequency of 1 MHz and an input power level of 1 Vrms, and were measured for their temperature coefficients of capacitance TCC at a frequency of 1 MHz over a temperature range of from −55° C. to 125° C. Furthermore, the samples were measured for their diameters (D) and thicknesses (T) to an accuracy of ±5 μm and were measured for their weights (m) to an accuracy of ±5 μmg to calculate their dielectric constants $\epsilon$ r. The results were as shown in Tables 7 and 8.

Figure 4:
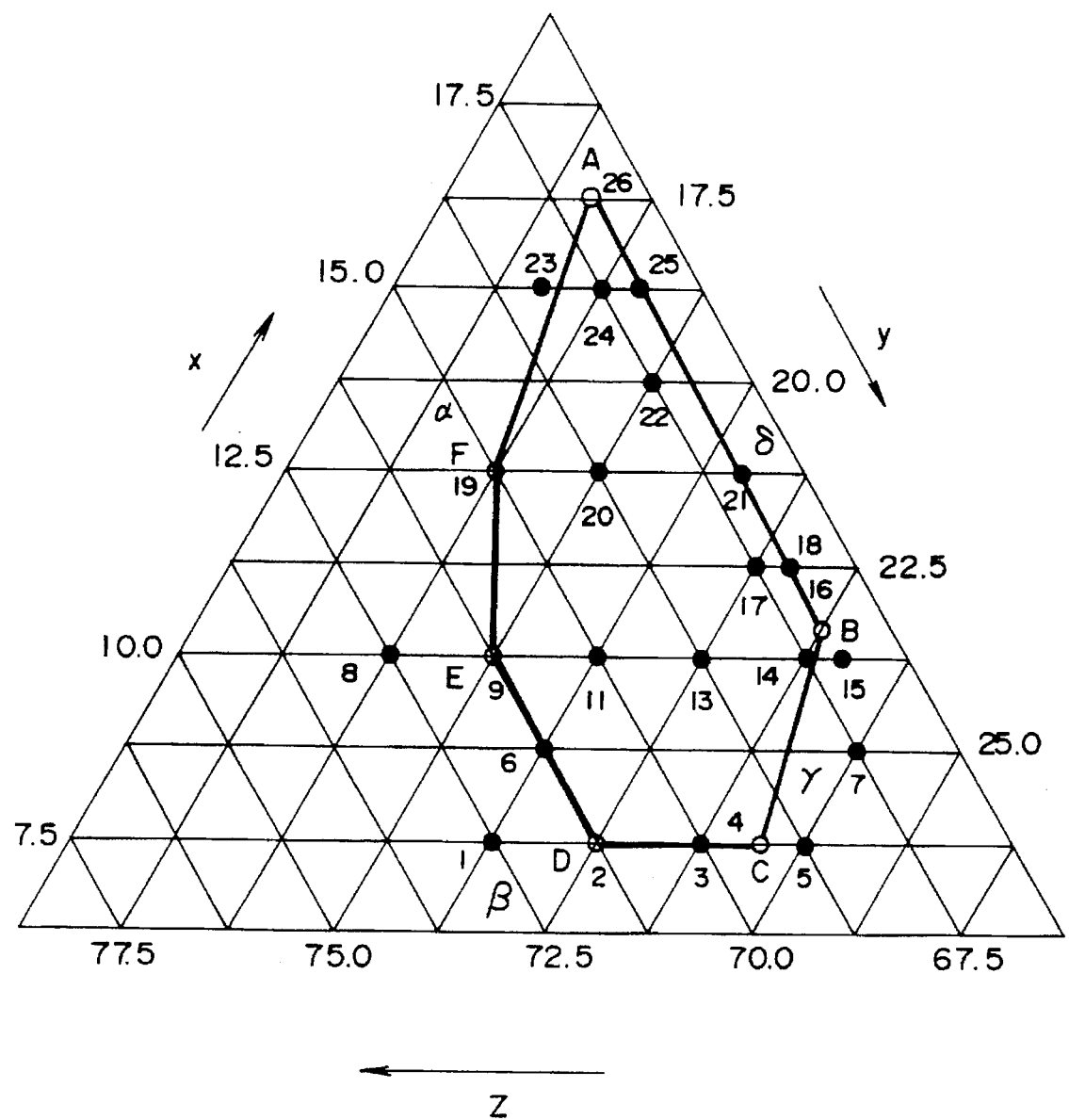
FIG. 4 is a TERNARY diagram illustrating preferred ranges of a molar composition of the system of BaO—(Nd$_2$O$_3$·Sm$_2$O$_3$)—TiO$_2$ according to the present invention.

It will be understood from Tables 7 and 8 that in a region α of FIG. 4, satisfactory properties are not obtained since the temperature coefficient of capacitance is greatly shifted toward the minus side and in a region γ, satisfactory properties are not obtained since the temperature coefficient is greatly shifted toward the plus side. In a region β, satisfactory properties are not obtained since the dielectric constant is too small and in a region δ, dense ceramic is not obtained since the sintering property is deteriorated.

It will further be understood that the Q-value decreases and the dielectric property is deteriorated as the amount of manganese becomes smaller than 0.01% by weight or no smaller than 0.5% by weight reckoned as $MnCO_3$. Furthermore, introduction of sodium deteriorates the sintering property. Accompanying this, the dielectric constant decreases, Q-value decreases and temperature coefficient of capacitance TCC is deteriorated. As the amount of silicon increases, furthermore, the dielectric constant decreases, absolute value of the temperature coefficient of capacitance TCC increases and Q-value decreases. On the other hand, the dielectric ceramic composition of the present invention exhibits excellent properties such as a dielectric constant of as large as not smaller than 50, a Q-value of not smaller than 3000 and a temperature coefficient of within ±30 ppm/°C. Moreover, preventing the introduction of silicon makes it

17 possible to prepare a ceramic having a stable temperature coefficient of capacitance and a high dielectric constant.

EXAMPLE 3

Powders of $BaCO_3$, $TiO_2$, $ZrO_2$, $SnO_2$ and $MnCO_3$ having purities of not smaller than 99% and a powder of $Nd_2O_3$ (into which may be introduced Pr and the like as impurities of rare earth oxides) having purities of not smaller than 95% were used as starting materials, and the amounts of impurities in the starting materials were controlled to adjust the contents of Na and Si in the composition. These powders were weighed at ratios shown in Tables 9, 10 and 11, and were mixed together a whole day and night using resin balls while adding pure water thereto.

18

The mixture was dried and was then calcined at 1180° C. for 2 hours. The calcined powder was pulverized by using a ball mill for 20 hours, and an organic sticking agent was added thereto, followed by stirring. The mixture was then molded into a green sheet of a thickness of 50 μm by a doctor blade method.

25 Pieces of this green sheet were stacked one upon the other and were hot-pressed to prepare a green molded plate which was then punched into a disk 20 mm in diameter and about 1 mm in thickness. The molded article was then subjected to a treatment at 300° C. for 2 hours to remove the binder, and was then calcined in the air at a temperature of 1280° to 1340° C. for 2 hours.

TABLE 9

| | Composition ratio | | | | | Impurities, additives | | |
|---|---|---|---|---|---|---|---|---|
| Sample No. | x (mol %) | y (mol %) | z (mol %) | substituted with | c | $MnCO_3$ (wt %) | reckoned as $SiO_2$ | Na |
| *1 | 7.500 | 21.250 | 71.250 | Zr | 0.05 | 0.2 | <0.01 | <0.01 |
| 2 | 7.500 | 22.500 | 70.000 | Zr | 0.01 | 0.2 | <0.01 | <0.01 |
| *3 | 7.500 | 23.750 | 68.750 | Zr | 0.01 | 0.2 | <0.01 | <0.01 |
| 4 | 8.750 | 20.000 | 71.250 | Zr | 0.05 | 0.2 | <0.01 | <0.01 |
| 5 | 8.750 | 22.500 | 68.750 | Zr | 0.01 | 0.2 | <0.01 | <0.01 |
| *6 | 8.750 | 23.750 | 67.500 | Zr | 0.01 | 0.2 | <0.01 | <0.01 |
| 7 | 9.170 | 19.170 | 71.660 | Zr | 0.05 | 0.2 | <0.01 | <0.01 |
| *8 | 10.000 | 17.500 | 72.500 | Zr | 0.10 | 0.2 | <0.01 | <0.01 |
| 9 | 10.000 | 18.750 | 71.250 | Zr | 0.10 | 0.2 | <0.01 | <0.01 |
| 10 | 10.000 | 20.000 | 70.000 | Zr | 0.05 | 0.2 | <0.01 | <0.01 |
| 11 | 10.000 | 22.500 | 67.500 | Zr | 0.01 | 0.2 | <0.01 | <0.01 |
| *12 | 10.000 | 23.000 | 67.000 | Zr | 0.01 | 0.2 | <0.01 | <0.01 |
| 13 | 10.500 | 22.500 | 67.000 | Zr | 0.01 | 0.2 | <0.01 | <0.01 |
| 14 | 11.250 | 20.000 | 68.750 | Zr | 0.01 | 0.2 | <0.01 | <0.01 |
| 15 | 11.250 | 21.250 | 67.500 | Zr | 0.01 | 0.2 | <0.01 | <0.01 |
| 16 | 11.250 | 21.750 | 67.000 | Zr | 0.01 | 0.2 | <0.01 | <0.01 |
| *17 | 11.250 | 22.083 | 66.667 | Zr | 0.05 | 0.2 | <0.01 | <0.01 |
| 18 | 12.500 | 17.500 | 70.000 | Zr | 0.10 | 0.2 | <0.01 | <0.01 |
| 19 | 12.500 | 18.750 | 68.750 | Zr | 0.05 | 0.2 | <0.01 | <0.01 |
| 20 | 12.500 | 20.000 | 67.500 | Zr | 0.01 | 0.2 | <0.01 | <0.01 |
| 21 | 12.500 | 20.500 | 67.000 | Zr | 0.01 | 0.2 | <0.01 | <0.01 |
| *22 | 12.500 | 20.833 | 66.667 | Zr | 0.01 | 0.2 | <0.01 | <0.01 |
| 23 | 13.750 | 18.750 | 67.500 | Zr | 0.05 | 0.2 | <0.01 | <0.01 |
| *24 | 15.000 | 17.000 | 68.000 | Zr | 0.05 | 0.2 | <0.01 | <0.01 |
| 25 | 15.000 | 17.500 | 67.500 | Zr | 0.10 | 0.2 | <0.01 | <0.01 |

Samples marked with * lie outside the scope of the invention.

TABLE 10

| | Composition ratio | | | | | Impurities, additives | | |
|---|---|---|---|---|---|---|---|---|
| Sample No. | x (mol %) | y (mol %) | z (mol %) | substituted with | c | $MnCO_3$ (wt %) | reckoned as $SiO_2$ | Na |
| 26 | 15.000 | 18.000 | 87.000 | Zr | 0.10 | 0.2 | <0.01 | <0.01 |
| 27 | 15.500 | 17.500 | 67.000 | Zr | 0.10 | 0.2 | <0.01 | <0.01 |
| *28 | 16.667 | 16.666 | 66.667 | Zr | 0.10 | 0.2 | <0.01 | <0.01 |
| 29 | 7.500 | 22.500 | 70.000 | 0.5 Zr + 0.5 Sn | 0.01 | 0.2 | <0.01 | <0.01 |
| 30 | 8.750 | 20.000 | 71.250 | 0.5 Zr + 0.5 Sn | 0.05 | 0.2 | <0.01 | <0.01 |
| 31 | 10.000 | 20.000 | 70.000 | 0.5 Zr + 0.5 Sn | 0.05 | 0.2 | <0.01 | <0.01 |
| 32 | 11.250 | 21.250 | 67.500 | 0.5 Zr + 0.5 Sn | 0.01 | 0.2 | <0.01 | <0.01 |
| 33 | 12.500 | 17.500 | 70.000 | 0.5 Zr + 0.5 Sn | 0.10 | 0.2 | <0.01 | <0.01 |
| 34 | 13.750 | 18.750 | 67.500 | 0.5 Zr + 0.5 Sn | 0.05 | 0.2 | <0.01 | <0.01 |
| 35 | 7.500 | 22.500 | 70.000 | Sn | 0.01 | 0.2 | <0.01 | <0.01 |
| 36 | 8.750 | 20.000 | 71.250 | Sn | 0.05 | 0.2 | <0.01 | <0.01 |
| 37 | 10.000 | 20.000 | 70.000 | Sn | 0.05 | 0.2 | <0.01 | <0.01 |
| 38 | 11.250 | 21.250 | 67.500 | Sn | 0.01 | 0.2 | <0.01 | <0.01 |
| 39 | 12.500 | 17.500 | 70.000 | Sn | 0.10 | 0.2 | <0.01 | <0.01 |

TABLE 10-continued

| Sample No. | Composition ratio | | | | | Impurities, additives | | |
|---|---|---|---|---|---|---|---|---|
| | x (mol %) | y (mol %) | z (mol %) | substituted with | c | MnCO$_3$ (wt %) | reckoned as SiO$_2$ | Na |
| 40 | 13.750 | 18.750 | 67.500 | Zr | 0.01 | 0 | <0.01 | <0.01 |
| *41 | 11.250 | 21.250 | 67.500 | Zr | 0.01 | 0 | <0.01 | <0.01 |
| 42 | 11.250 | 21.250 | 67.500 | Zr | 0.01 | 0.01 | <0.01 | <0.01 |
| 43 | 11.250 | 21.250 | 67.500 | Zr | 0.01 | 0.03 | <0.01 | <0.01 |
| 44 | 11.250 | 21.250 | 67.500 | Zr | 0.01 | 0.05 | <0.01 | <0.01 |
| 45 | 11.250 | 21.250 | 67.500 | Zr | 0.01 | 0.1 | <0.01 | <0.01 |
| 46 | 11.250 | 21.250 | 67.500 | Zr | 0.01 | 0.5 | <0.01 | <0.01 |
| *47 | 11.250 | 21.250 | 67.500 | Zr | 0.01 | 0.7 | <0.01 | <0.01 |
| 48 | 11.250 | 21.250 | 67.500 | Zr | 0.01 | 0.2 | <0.01 | 0.05 |
| 49 | 11.250 | 21.250 | 67.500 | Zr | 0.01 | 0.2 | <0.01 | 0.08 |
| 50 | 11.250 | 21.250 | 67.500 | Zr | 0.01 | 0.2 | <0.01 | 0.10 |

Samples marked with * lie outside the scope of the invention.

TABLE 11

| Sample No. | Composition ratio | | | | | Impurities, additives | | |
|---|---|---|---|---|---|---|---|---|
| | x (mol %) | y (mol %) | z (mol %) | substituted with | c | MnCO$_3$ (wt %) | reckoned as SiO$_2$ | Na |
| *51 | 11.250 | 21.250 | 67.500 | Zr | 0.01 | 0.2 | <0.01 | 0.17 |
| *52 | 11.250 | 21.250 | 67.500 | Zr | 0.01 | 0.2 | <0.01 | 0.50 |
| 53 | 13.750 | 18.750 | 67.500 | Zr | 0.01 | 0.2 | 0.03 | <0.01 |
| 54 | 13.750 | 18.750 | 67.500 | Zr | 0.01 | 0.2 | 0.05 | <0.01 |
| *55 | 11.250 | 21.250 | 67.500 | Sn | 0.01 | 0 | <0.01 | <0.01 |
| 56 | 11.250 | 21.250 | 67.500 | Sn | 0.01 | 0.01 | <0.01 | <0.01 |
| 57 | 11.250 | 21.250 | 67.500 | Sn | 0.01 | 0.03 | <0.01 | <0.01 |
| 58 | 11.250 | 21.250 | 67.500 | Sn | 0.01 | 0.05 | <0.01 | <0.01 |
| 59 | 11.250 | 21.250 | 67.500 | Sn | 0.01 | 0.1 | <0.01 | <0.01 |
| 60 | 11.250 | 21.250 | 67.500 | Sn | 0.01 | 0.5 | <0.01 | <0.01 |
| *61 | 11.250 | 21.250 | 67.500 | Sn | 0.01 | 0.7 | <0.01 | <0.01 |
| 62 | 11.250 | 21.250 | 67.500 | Sn | 0.01 | 0.2 | <0.01 | 0.05 |
| 63 | 11.250 | 21.250 | 67.500 | Sn | 0.01 | 0.2 | <0.01 | 0.08 |
| 64 | 11.250 | 21.250 | 67.500 | Sn | 0.01 | 0.2 | <0.01 | 0.10 |
| *65 | 11.250 | 21.250 | 67.500 | Sn | 0.01 | 0.2 | <0.01 | 0.17 |
| *66 | 11.250 | 21.250 | 67.500 | Sn | 0.01 | 0.2 | <0.01 | 0.50 |
| 67 | 13.750 | 18.750 | 67.500 | Sn | 0.01 | 0.2 | 0.03 | <0.01 |
| 68 | 13.750 | 18.750 | 67.500 | Sn | 0.01 | 0.2 | 0.05 | <0.01 |

Samples marked with * lie outside the scope of the invention.

Silver electrodes were formed on the upper and lower whole surfaces of the obtained ceramic disks to form disk-type capacitors of a single layer, which were then used as samples for evaluation.

The samples were measured for their electrostatic capacities (C) and quality s (Q-values) at a frequency of 1 MHz and an input power level of 1 Vrms, and were measured for their temperature coefficients of capacitance TCC at a frequency of 1 MHz over a temperature range of from <55° C. to 125° C. Furthermore, the samples were measured for their diameters (D) and thicknesses (T) to an accuracy of ±5 μm and were measured for their weights (m) to an accuracy of ±5 μmg to calculate their dielectric constants ε r. The results were as shown in Tables 4, 5 and 6.

The sintered products were quantitatively analyzed by means of atomic absorbency and ICP, and it was confirmed that the composition of Ba, Nd, Ti, Zr and Sn was basically the same as the recipe composition.

TABLE 12

| Sample No. | Dielectric Constant εr | TCC (ppm/C) | Q-value |
|---|---|---|---|
| *1 | 46 | 21 | 5700 |
| 2 | 51 | 14 | 10000 |
| *3 | 52 | 39 | 5100 |
| 4 | 50 | −1 | 7000 |
| 5 | 57 | 20 | 6500 |
| *6 | 59 | 54 | 8300 |
| 7 | 52 | −28 | 7100 |
| *8 | 50 | −39 | 8100 |
| 9 | 51 | 3 | 7000 |
| 10 | 57 | 5 | 5500 |
| 11 | 64 | 25 | 8200 |
| *12 | 64 | 36 | 8000 |
| 13 | 66 | 28 | 7600 |
| 14 | 67 | −20 | 6300 |
| 15 | 68 | 9 | 6800 |
| 16 | 68 | 16 | 7000 |
| *17 | | not sintered | |

TABLE 12-continued

| Sample No. | Dielectric Constant εr | TCC (ppm/C) | Q-value |
|---|---|---|---|
| 18 | 60 | −2 | 10000 |
| 19 | 67 | −8 | 9000 |
| 20 | 73 | −12 | 8500 |
| 21 | 73 | 2 | 8500 |
| *22 | | not sintered | |
| 23 | 72 | −20 | 8200 |
| *24 | 77 | −76 | 9000 |
| 25 | 69 | −24 | 9200 |

Samples marked with * lie outside the scope of the invention.

TABLE 13

| Sample No. | Dielectric Constant εr | TCC (ppm/C) | Q-value |
|---|---|---|---|
| 26 | 70 | −15 | 9000 |
| 27 | 70 | −30 | 10000 |
| *28 | 71 | −57 | 10000 |
| 29 | 51 | 14 | 10000 |
| 30 | 50 | −1 | 7500 |
| 31 | 57 | 4 | 5600 |
| 32 | 68 | 8 | 6800 |
| 33 | 60 | −2 | 10000 |
| 34 | 72 | −20 | 7700 |
| 35 | 51 | 13 | 10000 |
| 36 | 50 | −2 | 7400 |
| 37 | 58 | 4 | 5200 |
| 38 | 68 | 8 | 7500 |
| 39 | 60 | −2 | 10000 |
| 40 | 72 | −21 | 8200 |
| *41 | 64 | −2 | 750 |
| 42 | 66 | −1 | 3300 |
| 43 | 66 | −1 | 3500 |
| 44 | 66 | −1 | 4500 |
| 45 | 66 | −1 | 6000 |
| 46 | 67 | 0 | 7100 |
| *47 | 62 | 2 | 1800 |
| 48 | 68 | −2 | 6300 |
| 49 | 67 | −8 | 7000 |
| 50 | 67 | −9 | 6900 |

Samples marked with * lie outside the scope of the invention.

TABLE 14

| Sample No. | Dielectric Constant εr | TCC (ppm/C) | Q-value |
|---|---|---|---|
| *51 | 64 | −11 | 2200 |
| *52 | | not sintered | |
| 53 | 66 | −142 | 6000 |
| 54 | 64 | −22 | 6000 |
| *55 | 64 | −2 | 680 |
| 56 | 66 | −2 | 3100 |
| 57 | 66 | −2 | 3600 |
| 58 | 67 | −2 | 5000 |
| 59 | 67 | −2 | 6800 |
| 60 | 67 | −1 | 5600 |
| *61 | 62 | 1 | 1500 |
| 62 | 68 | −3 | 6700 |
| 63 | 68 | −9 | 6800 |
| 64 | 67 | −10 | 7300 |
| *65 | 64 | −12 | 2500 |
| *66 | | not sintered | |
| 67 | 67 | −15 | 6300 |
| 68 | 65 | −23 | 5800 |

Samples marked with * lie outside the scope of the invention.

Figure 5:
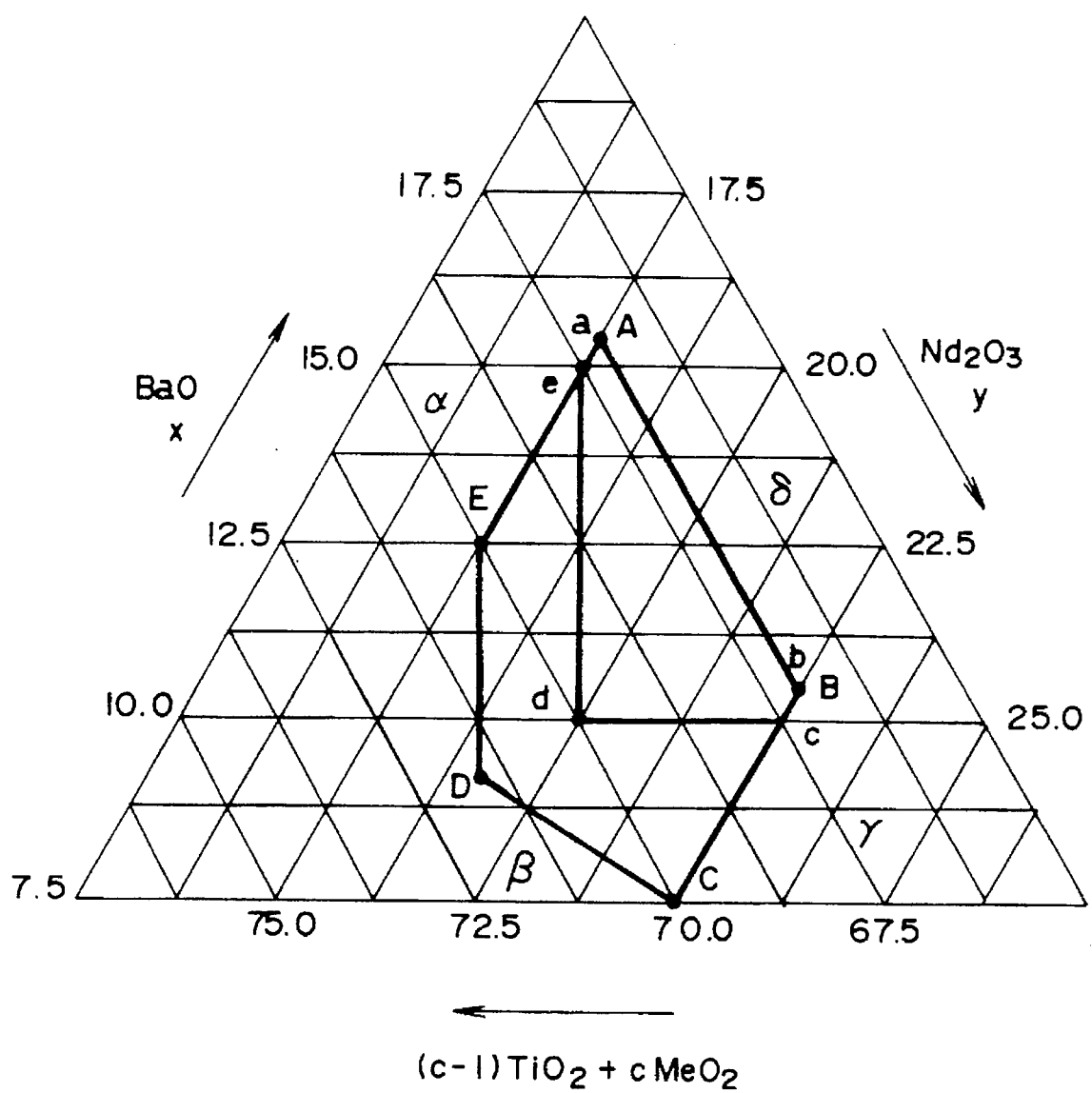
FIG. 5 is a TERNARY diagram illustrating preferred ranges of a molar composition of the system of BaO—Nd$_2$O$_3$—(TiO$_2$+MeO$_2$) according to the present invention.

It will be understood from Tables 12, 13 and 14 that in a region α of FIG. 5, satisfactory properties are not obtained since the temperature coefficient of capacitance TCC is greatly shifted toward the minus side and in a region γ, satisfactory properties are not obtained since the temperature coefficient of capacitance TCC is greatly shifted toward the plus side. In a region β, satisfactory properties are not obtained since the dielectric constant is too small and in a region δ, dense ceramic is not obtained since the sintering property is deteriorated.

It will further be understood that the Q-value decreases and the dielectric property is deteriorated as the amount of manganese becomes smaller than 0.01% by weight or no smaller than 0.5% by weight reckoned as $MnCO_3$.

Furthermore, introduction of sodium deteriorates the sintering property. Accompanying this, the dielectric constant decreases, Q-value decreases and temperature coefficient of capacitance TCC is deteriorated.

As the amount of silicon increases, furthermore, the dielectric constant decreases, absolute value of the temperature coefficient of capacitance TCC increases and Q-value decreases.

On the other hand, the dielectric ceramic composition of the present invention exhibits excellent properties such as a dielectric constant of as large as not smaller than 50, a Q-value of not smaller than 3000 and a temperature coefficient of within 0±30 ppm/°C. Moreover, preventing the introduction of silicon makes it possible to prepare a ceramic having a stable temperature coefficient and a high dielectric constant.

We claim:

1. A dielectric ceramic composition comprising a composite oxide containing, as metal elements, main components of BaO, $Nd_2O_3$, and $TiO_2$, a manganese component, wherein the manganese component is contained in an amount of from 0.01 to 0.5% by weight reckoned as $MnCO_3$ with respect to the main components, and a sodium component which is an impurity contained in an amount of not more than 0.10% by weight, wherein said main components have a molar composition represented by the following formula

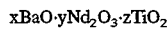

$xBaO \cdot yNd_2O_3 \cdot zTiO_2$ wherein x, y and z are numbers satisfying the following relations, $x+y+z=100$,
$x \geq 7.5$,
$x \leq 12.5$,
$y \geq 20.0$,
$z \geq 67.0$,
$y \leq 0.4286z - 5.7143$
and
$z \leq -0.6667x + 76.25$.

2. A dielectric ceramic composition according to claim 1, wherein an $Nd_4Ti_3O_{24}$ phase and an $Nd_2Ti_2O_7$ phase are contained in a crystalline phase.

3. A dielectric ceramic composition according to claim 1, wherein in said formula $xBaO \cdot yNd_2O_3 \cdot zTiO_2$, x, y and z lie within a range that satisfies the following relation, $x \geq 10.0$
$x \leq 12.3$
$y \geq 20.0$
$z \geq 67.0$
and
$z \leq 68.75$.

4. A dielectric ceramic composition comprising a composite oxide containing, as metal elements, main components of BaO, $Nd_2O_3$, $Sm_2O_3$, and $TiO_2$, a manganese component, wherein the manganese component is contained in an amount of from 0.01 to 0.5% by weight reckoned as $MnCO_3$ with respect to the main components, and a sodium component which is an impurity contained in an amount of not more than 0.10% by weight, wherein said main components have a molar composition represented by the following formula $$xBaO\cdot y((1-b)Nd_2O_3+bSm_2O_3)\cdot zTiO_2$$

wherein x, y and z are numbers satisfying the following relations, x+y+z=100, x≧7.5, z≧67.0 z≦71.25 y≧-0.5x+23.75 y≦0.3333z+0.1667 and x≦-5y+100, and b is a number satisfying the following relation, 0.05≦b<1.

5. A dielectric ceramic composition according to claim 4, wherein in the formula $xBaO\cdot y((1-b)Nd_2O_3+bSm_2O_3)\cdot zTiO_2$, b is a number of from 0.05 to 0.95.

6. A dielectric ceramic composition according to claim 4, wherein in said formula $xBaO\cdot y((1-b)Nd_2O_3+bSm_2O_3)\cdot zTiO_2$, x, y and z lie within a range that satisfies the following relations, z≧67.0 y≦22.5 x≧10.0 y≧1.0667x+31.9167 and z≦-0.8x+80.

7. A dielectric ceramic composition comprising a composite oxide containing, as metal elements, main components of BaO, $Nd_2O_3$, $TiO_2$, and $MeO_2$, wherein Me is Zr and/or Sn, a manganese component, wherein the manganese component is contained in an amount of from 0.01 to 0.5% by weight reckoned as $MnCO_3$ with respect to the main components, and a sodium component which is an impurity contained in an amount of not more than 0.10% by weight, wherein said main components have a molar composition represented by the following formula $$xBaO\cdot yNd_2O_3\cdot z((1-c)TiO_2+cMeO_2)$$

wherein x, y and z are numbers satisfying the following relations, y≧17.5, y≦22.5 z≧67.0 z≦-0.495x+76.2312 and x≧1.006z-62.9217 and c is a number satisfying the following relation

0<c<1.

8. A dielectric ceramic composition according to claim 7, wherein in the formula $xBaO\cdot yNd_2O_3\cdot z((1-c)TiO_2+cMeO_2)$, c is a number of from 0.01 to 0.10.

9. A dielectric ceramic composition according to claim 7, wherein in the formula $xBaO\cdot yNd_2O_3\cdot z((1-c)TiO_2+cMeO_2)$, x, y and z lie within a range that satisfies the following relations, y≧17.5 y≦22.5 z≧67.0 x≧10.0 and z≦-0.5x+75.

10. The dielectric ceramic composition of claim 7, wherein the component $Nd_2O_3$ in the main components is partly substituted by $Sm_2O_3$.

* * * * *